US006886339B2

(12) United States Patent
Carroll et al.

(10) Patent No.: US 6,886,339 B2
(45) Date of Patent: May 3, 2005

(54) TROUGH-STIRLING CONCENTRATED SOLAR POWER SYSTEM

(75) Inventors: Joseph P. Carroll, Moorpark, CA (US); Terrence H. Murphy, Westlake Village, CA (US); Patrick E. Frye, Simi Valley, CA (US); William D. Otting, Westlake, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/440,840

(22) Filed: May 19, 2003

(65) Prior Publication Data

US 2004/0231329 A1 Nov. 25, 2004

(51) Int. Cl.[7] .............................................. B60K 16/00
(52) U.S. Cl. ................. 60/641.8; 60/641.11; 60/641.15
(58) Field of Search ........................... 60/641.8, 641.11, 60/641.15

(56) References Cited

U.S. PATENT DOCUMENTS

| | | | | |
|---|---|---|---|---|
| 4,069,812 A | * | 1/1978 | O'Neill ....................... | 136/246 |
| 4,408,595 A | * | 10/1983 | Broyles et al. ............. | 126/570 |
| 4,611,575 A | * | 9/1986 | Powell ....................... | 126/605 |
| 5,113,659 A | | 5/1992 | Baker et al. | |
| 5,459,996 A | | 10/1995 | Malloy et al. | |
| 5,899,071 A | * | 5/1999 | Stone et al. ............... | 60/641.8 |
| 6,065,284 A | | 5/2000 | Horner et al. | |
| 6,080,927 A | * | 6/2000 | Johnson ....................... | 136/248 |
| 6,442,937 B1 | * | 9/2002 | Stone et al. ............. | 60/641.11 |
| 6,735,946 B1 | | 5/2004 | Otting et al. | |

OTHER PUBLICATIONS

Price, Hank & David Kearney, Parabolic–Trough Technology Roadmap: A Pathway for Sustained Commercial Development and Deployment of Parabolic Trough Technology, Jan. 1999; Report No. NREL/TP–55024748.

Wood, James G. Neill W. Lane & William T. Beale, Preliminary Design of a 7kWe Free–Piston Stirling Engine with Rotary Generator Output, Sep. 24, 2001, Proceedings of the 10th International Stirling Engine Conference.

Leitner, Arnold, Fuel from the Sky: Solar Power's Potential for Western Energy Supply, Jul. 2002; NREL/Bk–550–32160.

Sandia National Laboratory, Overview of Solar Thermal Technologies.

http://www.grc.nasa.gov/WWW/tmbs/stirling/animation/anim_1.html.

DOE's Concentrating Solar Power Overview, 8 pages.

Sun Lab Snapshot, Solar Trough Power Plants: Large–scale, low–cost, reliable solar energy, 2 pages.

Federal Energy Management Program (FEMP), Technology Profiles, Parabolic–Trough Solar Collectors, Aug. 29, 2002, 4 pages.

* cited by examiner

Primary Examiner—Hoang Nguyen
(74) Attorney, Agent, or Firm—Harness Dickey & Pierce P.L.C.

(57) ABSTRACT

A solar power collection system capable of operating with a positioning system that provides movement of the system about only a single axis of rotation. The solar power collection system includes a concentrator having at least one parabolic-trough-shaped mirror that focuses sun light reflected therefrom along a longitudinal focus line defined by a focus of the parabolic-trough shaped mirror. An absorber having a heat absorbing tube and a heat absorbing shoe is supported from the mirror such that the tube is positioned coaxially along the focus line to receive reflected sun light. The tube absorbs thermal from the sun light and conductively heats the shoe. The shoe supplies this thermal energy to an energy conversion engine. The engine, in one preferred form, is a Stirling engine that converts the thermal energy into electrical energy. A pointing system moves the concentrator about a single axis of rotation to track the sun across the horizon.

20 Claims, 1 Drawing Sheet

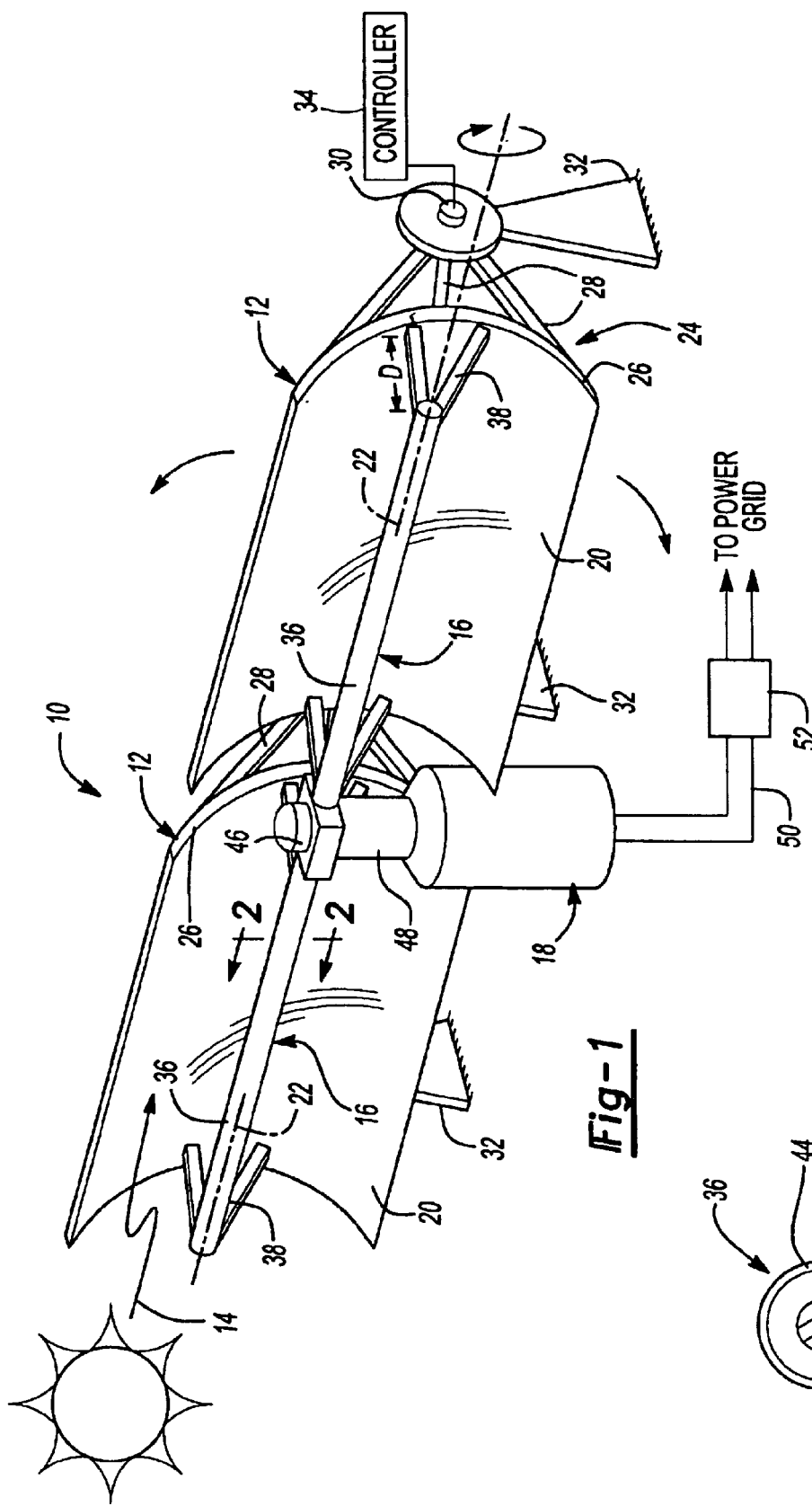

TROUGH-STIRLING CONCENTRATED SOLAR POWER SYSTEM

FIELD OF THE INVENTION

The present invention relates to the field of electrical energy generation through solar power collection, and more particularly, to solar power generation using parabolic-trough concentrators integrated with multiple Stirling Engines.

BACKGROUND OF THE INVENTION

The desire to decrease and ultimately eliminate dependence on fossil fuels has stimulated research into clean and renewable ways to produce electricity for the global marketplace. Solar power has become a viable option because it is a clean form of energy production and there is a potentially limitless supply of solar radiation. To that end, it is estimated the solar energy flux from the sun is approximately 2.7 megawatt-hours per square meter per year in certain advantageous areas of the world. With this tremendous amount of free and clean energy available, together with the desire to reduce dependence on fossil fuels, solar power production has become a well recognized means for meeting a portion the energy needs in various countries around the world.

Technological innovations and improvements have moved terrestrial solar power generation into the range of feasible large scale power production. More specifically, the reduction in the magnitude of capital investment required and the reduction in recurring operation and maintenance costs allow solar power generation to compete with other forms of terrestrial power generation. Further, the scalability of solar power plants has the potential to provide smaller facilities, on the order of ten kilowatts, to communities with smaller demands and larger facilities, on order of one hundred megawatts, to large metropolitan areas with higher demand.

To address the above demand for solar power systems, many configurations have been designed and implemented. One such implementation is a concentrated solar power system that collects solar energy and concentrates that energy onto an absorber. The absorbed optical energy provides a source of thermal energy to operate a power conversion cycle, for example a heat engine. The heat engine then produces electricity that is eventually fed into the electrical grid.

A typical concentrated solar power system uses parabolic dishes for concentrators and Stirling engines for power conversion. Parabolic dish concentrators, however, are expensive. Further, the dish concentrator configuration has stringent two-axis pointing requirements to maintain the focus of the dish concentrator at the absorber and achieve the desired concentration of solar energy. Along with high capital costs for dish concentrators, the high temperatures at the focus of a dish concentrator can increase material and maintenance costs of the absorber and peripheral equipment. To adequately measure the above costs, a common metric, dollars per kilowatt-hour, is used to assess overall solar power system efficiency. Any reduction, therefore, in capital expenditures or recurring maintenance and operational expenses, while being able to produce comparable power output, will result in an overall cost savings in the operation of such a solar power system.

Replacement of the dish concentrator with a trough concentrator has the potential to significantly decrease the capital costs of a solar power generation system and eliminates the need for stringent two-axis pointing system. The high temperature point focus is now replaced with a moderate temperature line focus. A linear absorber is used on the line focus of the trough concentrator utilizing a vacuum jacketed tube to provide efficient collection of the solar energy. Nevertheless, the above changes must not adversely affect the basic efficiency of the solar power system configuration.

SUMMARY OF THE INVENTION

The present invention is directed to a solar power system wherein sun light is converted to electrical energy. In one preferred form, the solar power system comprises a concentrator, an absorber, a converter, and a pointing system. The converter has at least one mirror that focuses the sun light to a focus line. The absorber tube has a glass vacuum jacket and an inner core. The absorber tube is connected and aligned to the line focus of the concentrator. The inner core transports heat to the hot shoe of the power conversion engine. The power conversion engine converts heat energy to electrical energy. The hot shoe couples and conducts heat from the inner core to the power conversion engine A pointing system aligns the solar power collection system to the sun light. The trough concentrator has a lower concentration ratio which results in a lower absorber temperature. By using the low cost trough concentrators and operating at lower temperatures significantly reduces the overall capital costs and operating costs.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is an environmental perspective view of a solar power system constructed in accordance with the teachings of the present invention; and FIG. 2 is a sectional view of an absorber tube taken in accordance with section line 2—2 in FIG. 1 illustrating the construction of the tube.

DETAILED DESCRIPTION OF THE PREFERRED EMBODIMENTS

The following description of the preferred embodiment(s) is merely exemplary in nature and is in no way intended to limit the invention, its application, or uses.

With reference to FIG. 1, a solar power system 10 is shown. The solar power system 10 includes a collector system 12. The collector system 12 gathers sunlight 14 and transmits the thermal energy from the sunlight 14 to a transfer system 16. The transfer system 16 is coupled to a conversion system 18 which uses the thermal energy from the sunlight 14 to create electricity.

The collector system 12 has a mirror 20. The mirror 20 serves to concentrate the reflected sunlight 14 at a longitudinal focal line 22 of the mirror 20. In this embodiment, the mirror 20 is generally trough-shaped and parabolic. The trough-shape of the mirror 20 reduces the overall temperature of the solar power system 10 since the thermal energy of the sunlight 14 is distributed along the focal line 22 and not focused on only a point. Hence, the temperature at the focal line 22 is nominally 400° C. (752° F.) compared to over 700° C. (1290° F.) for point focus systems.

The mirror 20 is coupled to a support structure 24 that includes a frame 26. The frame 26 supports the mirror 20. In general, the power level of the module dictates the sizing of the mirror 20 and the support structure 24. Increased power per module necessitates solar power systems 10 having larger mirrors 20 and larger support structures 24.

The frame 26 is coupled to a plurality of support beams 28. The support beams 28 connect the frame 26 to a pivot 30. The pivot 30 is rotatably coupled to a base 32. The base 32 is affixed to a ground surface as shown. The pivot 30 enables the mirror 20 to be adjusted as the sun travels across the sky. The pivot 30 provides one axis of rotation for the mirror 20, however, the pivot 30 can be replaced with a ball and socket pivot joint, as known in the art, if more than one axis of rotation is desired to account for seasonal variations in the height of the sun across the sky. A controller 34 coupled to the collector system 12 tracks the sun across the sky. The controller 34 drives a motor (not shown) to pivot the collector system 12 about the focal line 22 as known in the art.

The thermal energy from the collector system 12 is conducted to the transfer system 16. The transfer system 16 has an absorber tube 36 which has a plurality of support elements 38 to secure the absorber tube 36 to the support structure 24 of the collector system 12. In particular, the support elements 38 pass through the mirror 20 and attach to the frame 26 of the support structure 24. Hence, when the pivot 30 rotates the mirror 20 to follow the sun across the sky, the transfer system 16 rotates as well. The absorber tube 36 is positioned at the focal line 22 of the mirror 20 at a distance "D" dictated by the length of the support elements 38. To minimize conduction, the cross section of the support elements 38 are generally thin and tubular. The absorber tube 36 absorbs the thermal energy from the concentrated sunlight 14 along the focal line 22 of the mirror 20.

Referring now to FIG. 2, the construction of the absorber tube 36 is shown. To reduce convective heat loss to the atmosphere, the absorber tube 36 has a glass vacuum tubular jacket 44. The glass vacuum tubular jacket 44 encloses an inner core 42. The glass vacuum tubular jacket 44 provides a transparent sheath of insulation that allows solar energy to pass through, but insulates the inner core 42 from convective losses to the atmosphere. In addition, the inner core 42 may also be covered with a coating to provide increased absorption while reducing emissivity. Coating ratios of absorbtivity to emissivity greater than 0.8 provide the proper surface treatment for this application. The inner core 2 comprises a rod made from a conductive material, or a heat pipe. Referring back to FIG. 1, the thermal energy absorbed by the absorber tube 36 is transferred to the conversion system 18.

The conversion system 18 includes a shoe 46 coupled to the absorber tube 36 of the transfer system 16. Since the conversion system 18 is attached to the transfer system 16, the conversion system 18 rotates to follow the sun across the sky. The absorber tube 36 conducts the thermal energy to the shoe 46. The shoe 46 is made from a conductive material, such as, but not limited to, nickel, graphite or copper. In addition, the shoe 46 could be a heat pipe as known in the art. The shoe 46 transmits the thermal energy to an engine 48. The engine 48 converts the thermal energy into electricity. In this embodiment, the engine 48 comprises a free-piston Stirling engine. The free-piston Stirling engine is highly reliable while having a relatively small size, excellent scalability and lower cost than other available energy conversion engines. Although, a free-piston Stirling engine is used in this embodiment, many other engines are suitable, such as, for example, kinematic Stirling engines, Brayton cycle engines, or steam turbines. The thermal energy from the shoe 46 drives the engine 48 to create an alternating current (AC) output 50 as known in the art. An electrical connection 52 carries the AC output 50 to power grids in a conventional manner.

During operation, the sunlight 14 impinges on the mirror 20 of the collector system 12. The mirror 20 concentrates the sunlight 14 along the focal line 22. The absorber tube 36 absorbs the thermal energy generated by the concentration of sunlight 14 on the focal line 22. The absorber tube 36 transmits the absorbed thermal energy to the shoe 46. The engine 48 receives the thermal energy and converts the thermal energy into AC output 50. The electrical connection 52 carries the AC output 50 to local and national power grids.

Alternatively, the solar power system 10 can be constructed with multiple collector systems 12 and multiple transfer systems 16. This can be accomplished by using long rows of collector systems 12 constructed with the transfer systems 16 disposed above them. As appropriate, multiple shoes 46 can be disposed in line with the transfer system 16 and used to conduct thermal energy to multiple engines 48 for conversion into AC output 50. One skilled in the art will readily appreciate that the solar power system 10 can be scaled to accommodate a wide range of demands for solar power.

Typical solar power systems operate with higher temperatures at the absorber, with the absorber temperature generally in excess of 700° C. (1292° F.). Accounting for losses, the absorber would deliver heat to the converter at about 650° C. When the Stirling engine receives heat at a temperature of 650° C. (1202° F.), it typically produces electricity at a 30% efficiency. The higher temperatures, however, make such a system quite costly due to the high cost of the mirror, pointing system, and high temperature materials required. In the present invention, however, the power system utilizes a simple, low cost, trough concentrator. Since the concentration ratio is lower than current point focus systems, the absorber tube 36 has a temperature of about 400° C. (752° F.). Hence, the engine 48 produces electricity at slightly lower efficiency, however, the overall cost of the solar power system 10 is lower due to the significantly reduced cost of the concentrator, pointing system, and reduced capital and maintenance costs associated with the lower operating temperatures. The result is that solar power system 10 produces electricity at fewer dollars per kilowatt-hour than typical solar power systems. In addition, the use of the pivot 30 reduces capital costs, operating costs and maintenance costs when compared to the many other complicated, commonly used mirror positioning systems. Hence, the ability of the system 10 to operate efficiently at reduced operating temperatures, and with a less costly trough concentrator and positioning system, makes the solar power system 10 an even more desirable energy producing alternative to fossil fuel based energy producing systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solar power collection system wherein sun light is converted to electrical energy comprising:
   a concentrator having at least one mirror, wherein said mirror focuses the sun light to a focus line;
   a heat conducting shoe;
   an absorber having a tube fixed to and spaced apart from said mirror to extend substantially a length of said mirror in thermal communication with said shoe, wherein said tube is fixedly connected to said concentrator and positioned along said focus line to absorb solar energy reflected by said concentrator, said tube conducting heat produced by said solar energy to said shoe;
   a converter having an engine that converts heat energy to electrical energy, and wherein said shoe is disposed in longitudinal alignment with said tube and conductively couples said tube to said converter;
   a pointing system that aligns the concentrator in facing relationship to the sun light; and
   wherein said converter rotates in elevation with said mirror.

2. The system of claim 1, wherein said at least one mirror comprises a parabolic-trough-shaped mirror that focuses said sunlight to a longitudinal focus line.

3. The system of claim 1, wherein said tube and said shoe are constructed of a thermally conductive material or heat pipe.

4. The system of claim 3, wherein said conductive material comprises nickel.

5. The system of claim 3, wherein said tube and said shoe are constructed of one of copper and graphite.

6. The system of claim 1, wherein said tube comprises a heat pipe.

7. The system of claim 1, wherein said shoe comprises a heat pipe.

8. The system of claim 1, wherein said tube comprises a glass jacket enclosing a metallic element within a vacuum to prevent convective heat loss.

9. The system of claim 1, wherein said engine comprises a Stirling engine.

10. The system of claim 9, wherein said Stirling engine comprises a free-piston Stirling engine.

11. The system of claim 1, wherein said pointing system comprises a single-axis pointing system adapted to track the sun through the horizon during the day.

12. A solar power collection system for converting solar energy from the sun into electrical energy, comprising:
    a concentrator having a plurality of parabolic trough-shaped mirrors, wherein said mirrors focus reflected light to a focus line above a common vertex of said mirrors;
    at least one heat conducting shoe;
    an absorber having a plurality of tubes that are conductively coupled to said at least one shoe, wherein said tubes are fixedly connected to said mirrors, spaced apart from said mirrors to extend substantially a length of said mirrors, said tubes being coaxially aligned with said focus line to thereby receive solar energy focused on said focus line, said tubes absorbing the solar energy and producing heat, said heat being conducted to said at least one shoe, wherein said at least one shoe is disposed in longitudinal alignment with said tube;
    a converter conductively coupled to said at least one shoe and having at least one Stirling engine that converts said heat to electrical energy;
    a pointing system that aligns the concentrator to the sun, said pointing system including a single-axis system adapted to rotate said concentrator about an axis to track the sun across the horizon during the day; and
    wherein said converter rotates in elevation with said mirrors and said converter is disposed between said mirrors.

13. The system of claim 12, wherein said plurality of tubes and said plurality of shoes are constructed of a conductive material.

14. The system of claim 13, wherein said plurality of tubes and said plurality of shoes are comprised of nickel.

15. The system of claim 13, wherein said plurality of tubes and said plurality of shoes comprise one of copper and graphite.

16. The system of claim 12, wherein said plurality of tubes comprise heat pipes.

17. The system of claim 12, wherein said plurality of shoes comprise heat pipes.

18. The system of claim 12, wherein said plurality of tubes each comprise a glass vacuum jacket adapted to prevent convective heat loss.

19. The system of claim 12, wherein said plurality of Stirling engines comprise free-piston Stirling engines.

20. A method for collecting and converting solar power energy from sun light into electrical energy comprising:
    using at least one parabolic trough-shaped mirror to collect solar energy;
    providing at least one thermally conductive tube fixedly attached to and spaced apart from said mirror to extend substantially a length of said mirror and a thermally conductive tube shoe to absorb and conduct heat energy produced by said solar energy reflected by said mirror;
    providing at least one converter to convert said heat energy to electrical energy, said at least one converter disposed adjacent to said mirror;
    aligning said mirror with the sun light;
    using said mirror to focus the sun light reflected from said mirror along a longitudinally extending focus line;
    placing said tube in said focus line to absorb said reflected sun light, wherein said tube absorbs heat from said reflected sun light;
    placing said shoe in said focus line;
    transmitting said heat absorbed by said tube though said shoe to said converter;
    using said converter to convert said heat into said electrical energy; and
    rotating said converter in elevation with said mirror.

* * * * *